May 29, 1928.
E. R. JAGENBURG
1,671,723
FRUIT AND VEGETABLE CUTTING MACHINE
Filed Jan. 21, 1927
3 Sheets-Sheet 1
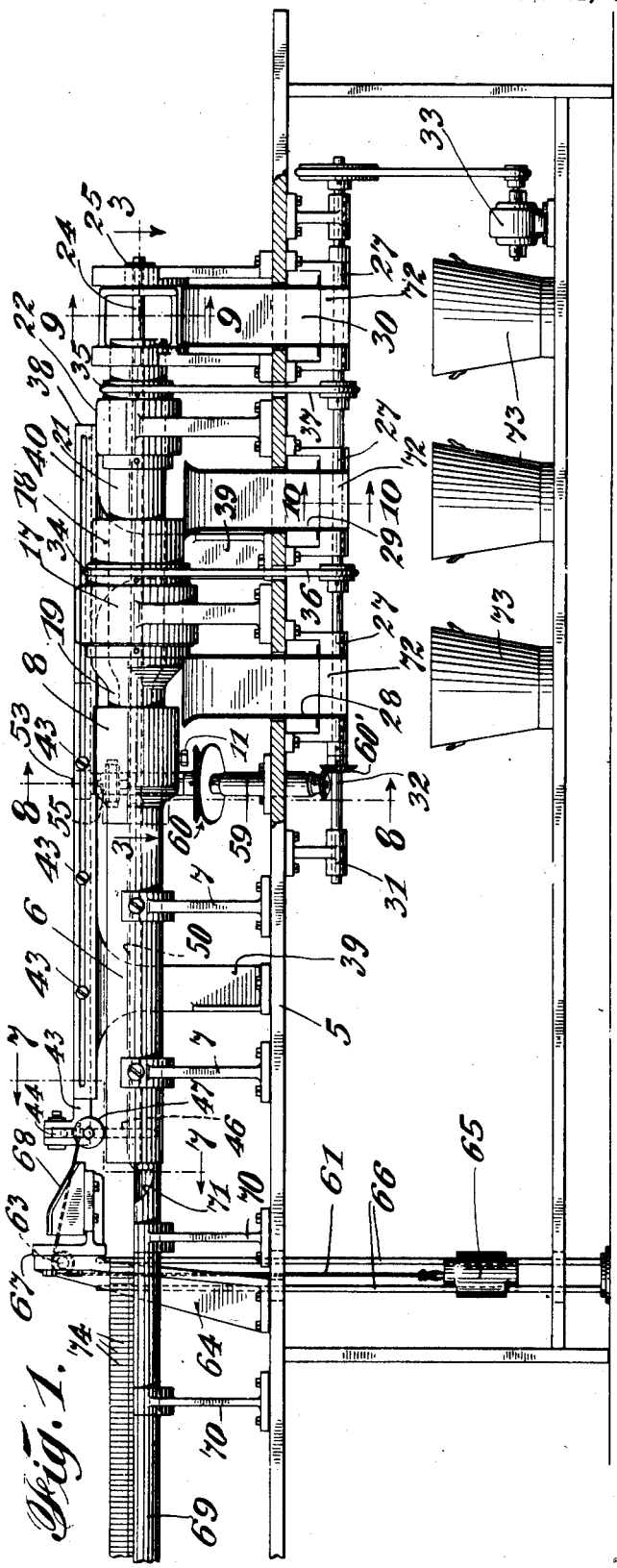
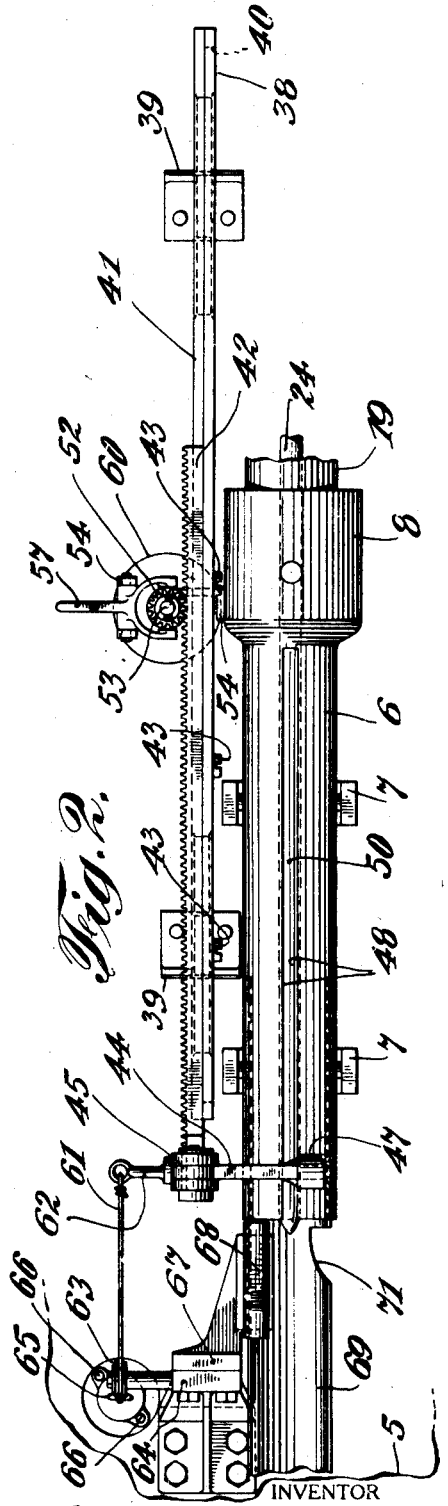
INVENTOR
E. R. Jagenburg
BY
his ATTORNEY May 29, 1928.  
E. R. JAGENBURG  
1,671,723  
FRUIT AND VEGETABLE CUTTING MACHINE  
Filed Jan. 21, 1927   3 Sheets-Sheet 2
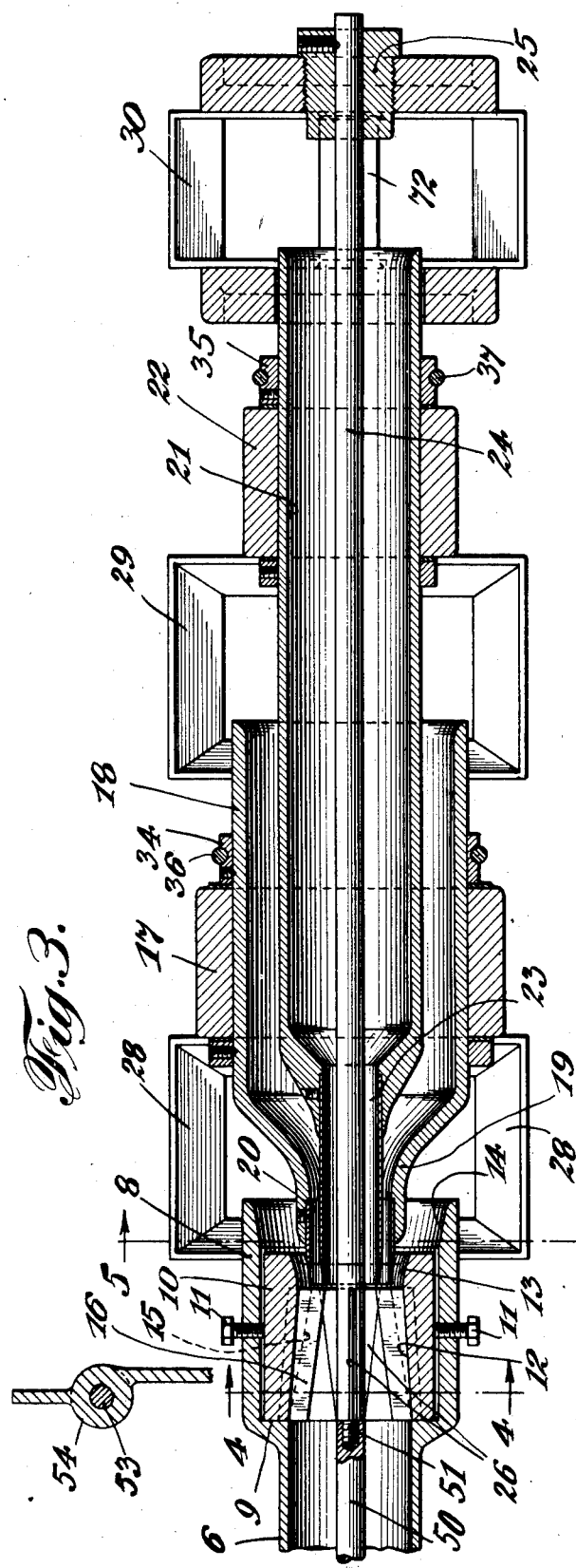
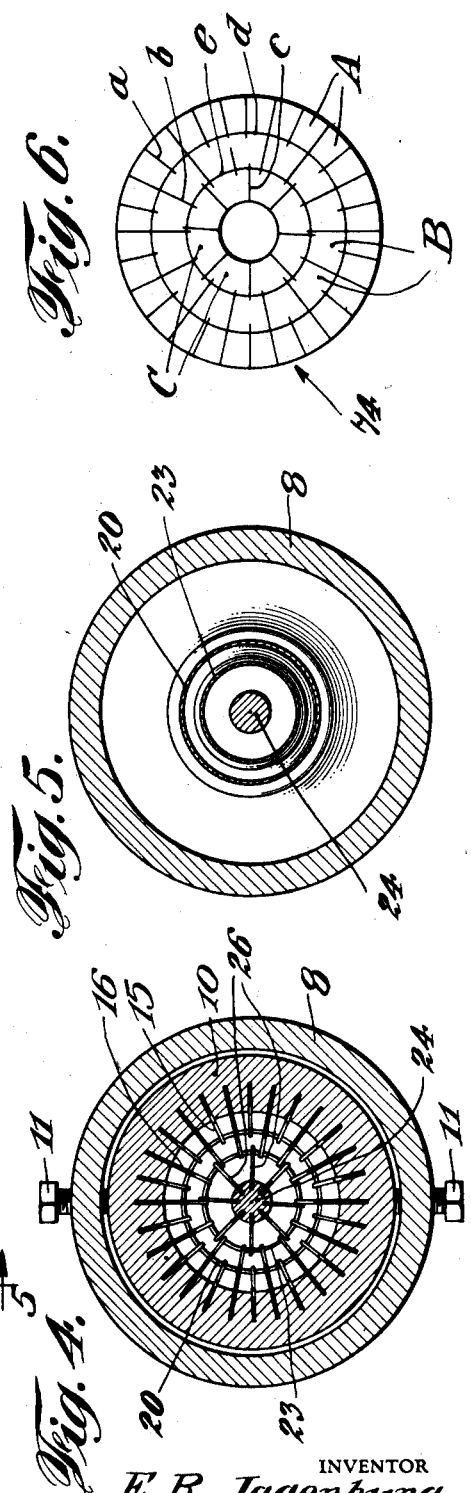
INVENTOR  
E. R. Jagenburg  
BY  
his ATTORNEY

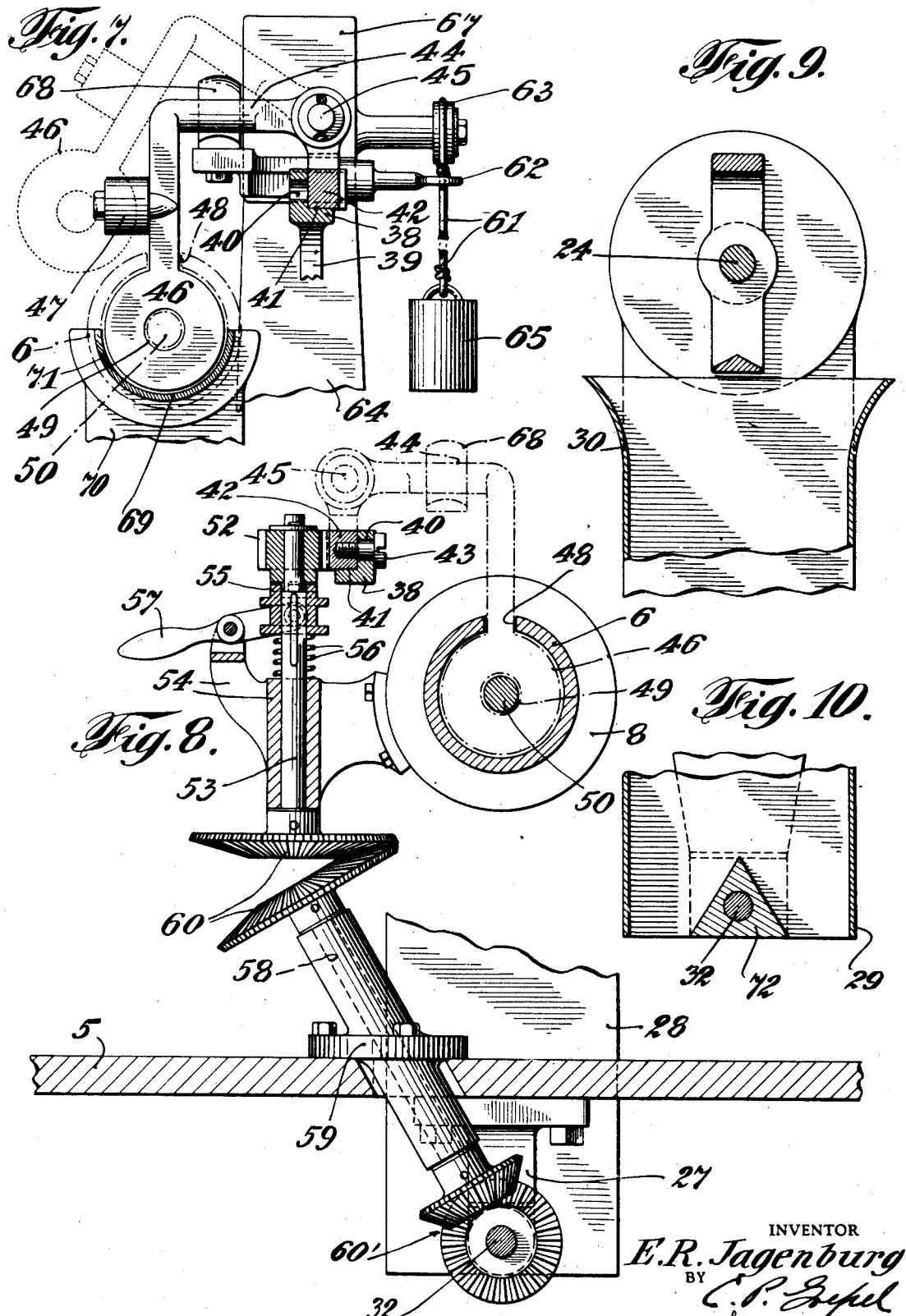

Patented May 29, 1928.

1,671,723

UNITED STATES PATENT OFFICE.

EUGENE R. JAGENBURG, OF DOUGLASTON, NEW YORK.

FRUIT AND VEGETABLE CUTTING MACHINE.

Application filed January 21, 1927. Serial No. 162,426.

This invention relates to fruit and vegetable cutting machines, and more particularly to a machine of the character shown and described in Patent No. 1,542,554, issued June 16, 1925.

As in the machine shown in said patent, by means of the present invention, fruits or vegetables which have first been cut into slices are further cut or divided into particles or pieces of uniform size, as is required especially in connection with fruits to be used for decorating pastries or desserts and for use generally by candy manufacturers and confectioners.

My present invention is designed primarily for operating upon fruit slices of relatively large size and has for its general object and purpose to provide means for expeditiously cutting such large fruit slices into a plurality of series of separate particles with the particles of each series of uniform size, and automatically grading the cut particles into the different sizes.

It is also an additional object of the invention to provide improved means for feeding the fruit slices from a magazine to the cutting knives including a travelling feed member and means for automatically displacing said feed member relative to the magazine for recharging the latter.

My invention also contemplates a machine of the above character which consists of relatively few parts of simple and inexpensive construction, the said parts being so mounted and assembled in cooperative relation with each other that the machine as a whole will occupy a minimum of floor space.

With the above and other objects in view, the invention consists in the improved fruit and vegetable cutting machine and in the form, construction and relative arrangement of its several parts as will be hereinafter more fully described, illustrated in the accompanying drawings, and subsequently incorporated in the subjoined claims.

In the drawings, wherein I have illustrated one simple and practical embodiment of the invention, and in which similar reference characters designate corresponding parts throughout the several views,—

Figure 1 is a side elevation partly in section illustrating a preferred form of my present improvements;

Fig. 2 is an enlarged top plan view of the feed mechanism;

Fig. 3 is a horizontal sectional view on an enlarged scale taken substantially on the line 3—3 of Fig. 1;

Fig. 4 is a transverse sectional view taken on the line 4—4 of Fig. 3;

Fig. 5 is a similar section taken on the line 5—5 of Fig. 3;

Fig. 6 is a plan view illustrating the manner in which the fruit slices are cut;

Fig. 7 is a transverse sectional view taken on the line 7—7 of Fig. 1;

Fig. 8 is a similar sectional view taken on the line 8—8 of Fig. 1, and

Figs. 9 and 10 are detail transverse sections taken respectively on the lines 9—9 and 10—10 of Fig. 1.

In the accompanying drawings, I have shown the several parts of the apparatus mounted upon a suitable table or bed plate 5. Above this table a cylindrical magazine 6 is horizontally disposed and supported upon the spaced standards 7. One end of this magazine is diametrically enlarged as at 8 to provide an internal annular shoulder 9 against which one end of the cylindrical knife carrying block 10 is engaged. This block may be removably fixed within the enlargement 8 of the magazine cylinder by set screws or other suitable means indicated at 11. The block 10 is of annular form and the inner surface 12 thereof is longitudinally inclined or tapered, the larger end of said internal surface aligning with the inner surface of the cylinder 6 and forming substantially a continuation thereof. At the smaller end of the tapering or inclined surface 12 which is spaced from the other end of the annular block 10, the remaining inner surface of said block is outwardly flared as at 13. The end portion of the enlargement 8 of the cylinder projecting beyond the end of the block 10 also has an outwardly flared or inclined inner surface 14.

The tapering or inclined face 12 of the knife block 11 is provided with a multiplicity of equi-distantly spaced knife blade receiving kerfs in which two series of knife blades 15 and 16 respectively, are fitted. The blades 15 are relatively narrow and have their cutting edges obliquely inclined and converging towards each other from the inner end of the block 10 to the outer ends of said blades. The other series of blades 16 are relatively wide and also have their cutting edges obliquely inclined in substantially parallel relation to the edges of the blades 15 and inwardly spaced from the edges of the latter blades. As clearly shown in Fig. 4 of the drawings, these wide and narrow blades which are carried by the cutting head 10 are alternately arranged.

In a suitable bearing standard 17 mounted upon the table 5 a cylinder 18 is rotatably supported, one end of said cylinder being contracted or reduced in diameter as at 19 and extending into the enlarged end 8 of the magazine cylinder 6. To this contracted end of the cylinder 18 a circular cutting knife 20 is secured and has its cutting edge disposed contiguous to the outer ends of the blades 15 and 16 and outwardly of the cutting edges of said ends of the blades 15.

A second cylinder 21 is rotatably supported in the bearing standard 22 on the table 5 and extends within the cylinder 18 in spaced concentric relation to the wall thereof. To one end of this inner cylinder the tubular knife 23 is fixed and extends through the knife 20 carried by the outer cylinder 18. The cutting edge of this inner knife is positioned in the same plane as the cutting edge of the knife 20 and is spaced inwardly therefrom contiguous to the outer ends of the cutting edges of the outer series of knife blades 16.

A rod 24 extends longitudinally through the cylinder 21 and the tubular knife 23 and is rigidly fixed at one of its ends in a suitable support 25 mounted upon the table 5. This rod has an end portion extending beyond the cutting edge of the tubular knife 23 and is positioned in the line of the axis of the magazine cylinder 6. To this projecting end of the rod 24, a third series of knife blades 26 are suitably fixed, said knife blades being radially arranged and positioned out of alignment with the blades 15 and 16. The cutting edges of the blades 26, as will be seen from reference to Fig. 3 of the drawings, are reversely inclined with respect to the cutting edges of the blades 15 and 16 and, adjacent the cutting edges of the tubular knives 20 and 23, overlap the cutting edges of the knife blades 16. The line of cut of the edge of the tubular knife 23 intersects these overlapped ends of the cutting edges of the blades 16 and 26.

In suitably spaced brackets 27 secured to the under side of the table 5, the lower ends of the deposit chutes 28, 29 and 30 respectively, are suitably fixed, said chutes extending upwardly through openings in the table 5 and having their upper open ends positioned beneath the enlarged end 8 of the magazine and the discharge ends of the cylinders 18 and 21 respectively. In these brackets 27 and the additional brackets 31, a longitudinally positioned operating shaft 32 is journalled, said shaft being driven by any suitable connections from the motor indicated at 33. Upon these cylinders 18 and 21 drive sleeves 34 and 35 respectively, are secured and connected with the operating shaft 32 by the endless drive belt 36 and 37. Thus, it will be understood that the two cylinders 18 and 21 and consequently the tubular knives 20 and 23 are located with respect to the fixed knife blades 15, 16 and 26.

At one side of the magazine 6 a longitudinally extending rail 38 is supported upon the upper ends of the standards 39 fixed on the bed plate or table 5, said rail having a longitudinal slot 40 extending substantially the full length thereof and provided at its lower edge with a flange 41 projecting from one side of the rail and upon which the rack bar 42 is slidably supported, said bar being provided with suitably spaced guide studs 43 movable in the slot 40 of the rail. Upon one end of the rail 38 an angular arm 44 is pivoted at one of its ends as at 45 for transverse swinging movement. The other end of this arm carries a feed disc 46, the diameter of which is slightly less than the internal diameter of the magazine 6. A suitable weight 47 is secured to the arm 44 to retain the same in the operative position indicated in Fig. 8 wherein the vertically positioned part of said arm is adapted to move longitudinally through the longitudinal slot 48 provided in the upper side of the magazine cylinder 6. The feed disc 46 has a central opening 49 to loosely receive the guide rod 50 which extends axially through the cylinder 6 and is detachably connected at one of its ends to the threaded stud 51 provided upon the end of the rod 24.

The rack 42 is positively moved in one direction along the rail 38 by a pinion 52 meshing with the teeth of said rack and loosely mounted on the upper end of a vertically positioned shaft 53, said shaft being journalled in a suitable bearing bracket 54 which may be conveniently secured upon one side of the enlarged end 8 of the feed cylinder. A clutch element 55 is slidably keyed to the shaft 53 and is adapted to be normally held in engagement with complementary clutch parts on the lower side of the pinion 52 by the spring indicated at 56. A pivotally mounted lever 57 is mounted on the bracket 54 and connected with the clutch member 55 whereby said clutch member may be disengaged from the pinion 52. The shaft 53 is driven through the medium of an angularly positioned shaft 58 journalled in a suitable bearing 59 secured to the table 5 and extending through an opening therein. The upper end of the shaft 58 is geared to the lower end of shaft 53 as at 60 while the lower end of shaft 58 is geared to one end of the operating shaft 32 as at 60'.

The movement of the rack 42 is reversed to return the feed disc 46 to a position beyond the outer end of the magazine 6 by means of a chain or cable 61 attached at one of its ends to an arm 62 fixed to the end of the rack, said cable extending over a suitable guide sheave 63 mounted upon the upper end of the standard 64 secured to the table 5 and is secured at its other end to a counterweight 65 which is vertically movable upon spaced guide rods 66.

Upon the upper end of standard 64 the bracket 67 is secured, said bracket having an obliquely inclined cam flange 68 which is positioned in the path of the horizontal part of the angular arm 44. Thus, it will be understood that as the rack 42 and feed disc 46 are retracted in the descent of the weight 65, and after said disc has been moved to a position beyond the end of the magazine 6, the arm 44 riding upon the inclined cam 68 is thrown upwardly, thus swinging the feed disc transversely to one side of the open end of the magazine as seen in dotted lines in Fig. 7 of the drawings.

In line with the lower portion of the wall of the magazine 6 and in substantial alignment therewith a horizontally positioned charging trough 69 is supported on the upper ends of the spaced standards 70 fixed to the bed plate or table 5. The wall of this trough at one side thereof and contiguous to the end of the magazine is cut away or recessed as indicated at 71 so as to permit of the transverse swinging movement of the feed disc 46 to is non-obstructing position as above explained.

In the lower end of each of the delivery or deposit chutes 28, 29 and 30 a triangular shaped member 72 is secured, thereby dividing the lower end of said chute into spaced outlets through which the fruit or vegetable particles are delivered into suitable collection receptacles 73 arranged beneath the bed plate or table 5.

As previously stated, the machine above described is primarily designed for the cutting of relatively large fruit or vegetable slices, such as for instance, pineapples. In particular, Hawaiian pineapples grow to a very large size, and after the outer husk has been removed, and the pineapple cored, the greater portion thereof may be cut into slices of uniform thickness and of substantially the same diameter. These pineapple slices indicated at 74 are arranged on edge in close relation to each other in the charging trough 69. With the feed disc 46 disposed in the dotted line position of Fig. 7, the pineapple slices are moved longitudinally from the trough 69 into the cylinder 6 until the latter is fully charged, the guide rod 50 being received in the central openings of the pineapple slices formed by the removal of the core. The motor 33 is then operated so as to drive the shaft 32, thereby operating the pinion 52 to move the rack 42 along the rail 38 and also imparting rotation to each of the cylinders 18 and 21. At the start of the movement of the rack 42, the weighted arm 44 moves downwardly on the inclined cam 68 and the feed disc 46 is positioned in concentric relation to the open end of the cylinder 6 and moves longitudinally into the same, thereby exerting pressure upon the pineapple slices in said cylinder and positively feeding the same under pressure against the cutting edges of the knives 15, 16 and 26.

Upon reference now to Fig. 6 of the drawings, it will be seen that as the pineapple slices are forced upon the knife blades, the blades 15 produce the relatively short radial cuts $a$ in the outer annular section of the fruit slice and between the spaced cuts $a$, the knife blades 16 produce the longer radial cuts $b$ while the knife blades 26 produce the radial cuts $c$ extending outwardly from the inner edge of the fruit slice and terminating at a point slightly beyond the inner ends of the cuts $b$. Since the knives 26 are out of radial alignment with the knives 15 and 16, it will be apparent that the cuts $c$ produced by the knives 26 will likewise be out of registering relation with the cuts $a$ and $b$. Therefore, it will be evident that there is no complete separation at any point of the fruit slice along a radial line. As the fruit slices are successively forced beyond the outer ends of the knife blades 15, 16 and 26, and before moving entirely out of contact with said blades, they are engaged by the cutting edges of the two tubular rotating knives 20 and 23. The knife 20 therefore, cuts through the fruit slice on the circular line $d$ substantially concentric to the outer edge of the fruit slice and intersecting the inner ends of the radial cuts $a$ and also intersecting the radial cuts $b$ substantially midway of their length. Thus, it will be seen that the outer annular section of the fruit slice is divided into a relatively large number of small particles or sections A of substantially uniform size.

The inner rotating knife 23 cuts through the fruit slice on the circular line $e$ which is concentric to the cut $d$ and intersects the inner ends of the radial cuts $b$ and the outer ends of the radial cuts $c$. Thus the intermediate annular section of the fruit slice is divided into a second series of portions B of less number than the portions A but of relatively greater size, while the innermost annular section of the fruit slice is divided into a third series of portions C which are of less number than the portions B but also are of somewhat greater size than said portions. Thus, it will be understood that each of the fruit slices is thus cut to provide portions of three different sizes which may be advantageously used for different purposes.

Upon referring now to Fig. 3 of the drawings, it will be seen that as the cut particles or portions of the fruit are forced under pressure beyond the outer end of the knife block 10, the smaller outer portions A pass outwardly of the rotating knife 20 through the cylinder end 8 and drop by gravity therefrom into the delivery chute 28. These particles striking upon the apex of the member 72 in the lower end of the chute are separated, and delivered at either side thereof to the first of the collection receptacles 73. The fruit particles B of the second size pass between the rotating knives 20 and 23 and into the rotating cylinder 18. Under the continuing pressure of the accumulating fruit particles and by gravity in the rotation of said cylinders, the particles are finally discharged from the open end of the cylinder into the upper end of the intermediate delivery chute 29 through which they are delivered into the second receptacle 73. The fruit particles C of the larger size pass through the inner tubular rotating knife 23 and through the rotating cylinder 21 and are discharged from the open end of the latter cylinder into the delivery chute 30 from which they are delivered to the third collection receptacle 73. Thus, the differently sized fruit portions or particles are selectively graded and collected in separate receptacles.

When the guide stud 43 fixed to the rack 42 strikes the right hand end of the slot 40 in the rail 38, the operation of the motor 33 is stopped. If desired, a suitable type of automatic switch may be provided for breaking the motor circuit. The shiftable clutch member 55 is then actuated to release the pinion 52 from its fixed connection with the shaft 53 so that the rack bar 42 may be retracted by the weight 65. At the end of this retracting movement, the feed disc 46 is lifted above the open end of the magazine cylinder as above explained, and the cylinder is then recharged with the fruit slices, after which the operation above described is repeated.

From the foregoing description considered in connection with the accompanying drawings, it will be seen that I have produced a relatively simple apparatus for repeatedly cutting fruit or vegetable slices into a large number of sections or portions of uniform size and for automatically selectively segregating portions of different sizes and delivering the same to separate collection receptacles. It will be understood that the essential feature of the present disclosure resides in the mounting and arrangement of the three series of fixed knives 15, 16 and 26 with respect to the rotating circular knives 20 and 23 whereby the desired cuts of the fruit slices as illustrated in Fig. 6 is obtained and the segregation of the differently sized fruit particles effected simultaneously with the complete cutting through of the fruit pulp to sever the particles of different sizes from each other. The positive pressure feeding means for the fruit slices as above described, while reliable and effective for the proper feeding of the slices to the cutting knives, is largely suggestive, and various other feeding devices might be substituted therefor. It will however, be observed that the described construction provides for a very compact arrangement of the several cooperating elements so that the machine as a whole will occupy a minimum of floor space. Also, since the several parts are of relatively simple construction, the initial cost of production and the maintenance cost of such a machine will be comparatively small.

While I have herein shown and described a practical embodiment of the several essential features of my present improvements, it is nevertheless to be understood that the apparatus might also be exemplified in numerous other alternative structural forms and I accordingly reserve the privilege of resorting to all such legitimate changes therein as may be fairly considered within the spirit and scope of the invention as claimed.

I claim:

1. In a fruit and vegetable cutting machine, cutting mechanism including two outer series of cutting knives of relatively different widths alternately arranged to produce alternating radial cuts of relatively different length extending inwardly from the outer surface of the fruit or vegetable, a third series of radially disposed cutting knives arranged inwardly of said outer series of knives and having their cutting edges converging towards the cutting edges of the wider outer series of knives and overlapping the latter at one of their ends and adapted to produce a third series of radial cuts in the fruit or vegetable extending outwardly from the center thereof, and additional concentrically spaced circular knives positioned contiguous to one end of the first named knives and adapted to cut through the fruit or vegetable on lines respectively intersecting the radial cuts produced by the two outer series of knives and the ends of the cuts formed by the wider outer series of knives and by the inner series of knives to thereby produce a plurality of series of separated portions and the portions in each series being of relatively different size from the portions in the other series.

2. In a machine for cutting annular fruit slices into a plurality of series of portions of relatively different sizes, radially arranged knives of different widths alternating with each other adapted to produce spaced cuts of relatively different lengths extending radially from one edge of the fruit slice, an additional radial series of knives for producing additional radial cuts extending from the other edge of the fruit slice and in overlapping relation to the wider cuts produced by the outer series of knives, and concentrically spaced circular knives contiguous to one end of said radial knives adapted to cut through the fruit slice on spaced circular lines intersecting the inner and outer radial cuts.

3. In a machine for cutting annular fruit slices into a plurality of series of portions of relatively different sizes, radially arranged knives of different widths alternating with each other adapted to produce spaced cuts of relatively different lengths extending radially from one edge of the fruit slice, an additional radial series of knives for producing additional radial cuts extending from the other edge of the fruit slice and in overlapping relation to the wider cuts produced by the first series of knives, an outer rotary circular knife adapted to cut through the fruit slice on a line intersecting the closed ends of the shorter first named radial cuts therein and substantially midway of the ends of the longer radial cuts, and a second inner rotary knife adapted to cut through the fruit slice on a line intersecting the overlapping ends of the longer radial cuts and the additional radial cuts.

4. In a machine for cutting annular fruit slices into a plurality of series of portions of relatively different sizes, radially arranged knives of different widths alternating with each other adapted to produce spaced cuts of relatively different lengths extending radially from one edge of the fruit slice, an additional radial series of knives for producing additional radial cuts extending from the other edge of the fruit slice and in overlapping relation to the wider cuts produced by the outer series of knives, an outer rotary circular knife adapted to cut through the fruit slice on a line intersecting the closed ends of the shorter first named radial cuts therein and substantially midway of the ends of the longer radial cuts, a second inner rotary knife adapted to cut through the fruit slice on a line intersecting the overlapping ends of the longer radial cuts and the additional radial cuts, and means for automatically segregating the cut fruit portions of different sizes and delivering the same into separate collection receptacles.

5. In a machine for cutting annular fruit slices into a plurality of series of portions with the portions of each series of relatively different size, cutting mechanism including a plurality of series of fixed radial knives and a plurality of rotating circular knives with their cutting edges contiguous to one end of the radial knives, means for feeding the fruit slices under pressure upon said radial knives, means for rotating said circular knives, and means for segregating the cut fruit portions of different sizes from each other and delivering the same into different collection receptacles.

6. In a machine for cutting fruit slices into a plurality of portions of relatively different sizes, a horizontally positioned magazine to receive the fruit slices, inner and outer series of radially positioned cutting knives mounted at one end of said magazine, concentrically spaced rotary circular knives having their cutting edges disposed contiguous to one end of the radial knives, means for rotating said circular knives, a pressure feed member in said magazine for forcibly feeding the fruit slices upon said radial knives, and means for actuating said feeding knives.

7. In a machine for cutting fruit slices into a plurality of portions of relatively different sizes, a horizontally positioned magazine to receive the fruit slices, inner and outer series of radially positioned cutting knives mounted at one end of said magazine, concentrically spaced rotary circular knives having their cutting edges disposed contiguous to one end of the radial knives, means for rotating said circular knives, a pressure feed member in said magazine for forcibly feeding the fruit slices upon said radial knives, means for actuating said feeding knives, manually operable means for disconnecting the feeding member from its operating means, means for withdrawing said feeding member from the magazine, and means for moving said feeding member to a non-obstructing position from the open end of the magazine to permit the latter to be recharged with the fruit slices.

8. In a machine for cutting annular fruit slices into a plurality of portions of relatively different sizes, cutting mechanism including a horizontally ararnged magazine for the fruit slices, inner and outer series of radial cutting knives mounted at one end of said magazine, inner and outer concentrically spaced rotatably mounted cylinders, tubular knives fixed to the corresponding ends of said cylinders and having their cutting edges concentrically spaced apart and positioned in a common plane contiguous to one end of said radial knives, means for rotating said cylinders, and means for forcibly feeding the fruit slices through said magazine to the cutting knives, the cut particles of the different sizes being moved under the feeding pressure through said tubular knives and into the respective cylinders and outwardly of the outer tubular knife, and means for delivering the separated fruit portions of the relatively different sizes into separate fruit portions of the relatively different sizes into separate collection receptacles.

9. In a fruit and vegetable cutting machine, cutting mechanism embodying a plurality of series of cutting members, the members in each series being arranged in relatively different radial planes around a common center to cut inner and outer and intermediate sections of the fruit or vegetable on spaced radial lines and the radial cuts in each section of the fruit or vegetable being differently spaced apart from the radial cuts of the other sections, and additional cutting members adapted to cut through the fruit or vegetable on spaced concentric circular lines intersecting said radial cuts to thereby separate each of said sections of the fruit or vegetable into a plurality of portions of different sizes from the portions of the other separated sections.

10. In a fruit and vegetable cutting machine, cutting mechanism embodying a plurality of series of cutting members in fixed relation to each other, the members in each series being arranged in relatively different radial planes around a common center to cut inner and outer and intermediate sections of the fruit or vegetable on spaced radial lines and the radial cuts in each section of the fruit or vegetable being differently spaced apart from the radial cuts of the other sections, and additional rotary cutting members arranged contiguous to said series of radial cutting members and adapted to cut through the fruit or vegetable on spaced concentric circular lines intersecting said radial cuts to thereby separate each of said sections of the fruit or vegetable into a plurality of portions of different sizes from the portions of the other separated sections.

In testimony that I claim the foregoing as my invention, I have signed my name hereto.

EUGENE R. JAGENBURG.